July 14, 1953 F. W. PFLEGER 2,645,423
MULTIPLICATION CONTROL MECHANISM
FOR CALCULATING MACHINES
Filed Jan. 10, 1951 8 Sheets-Sheet 1

Inventor
FREDERICK W. PFLEGER
By
George V. Hall
Attorney

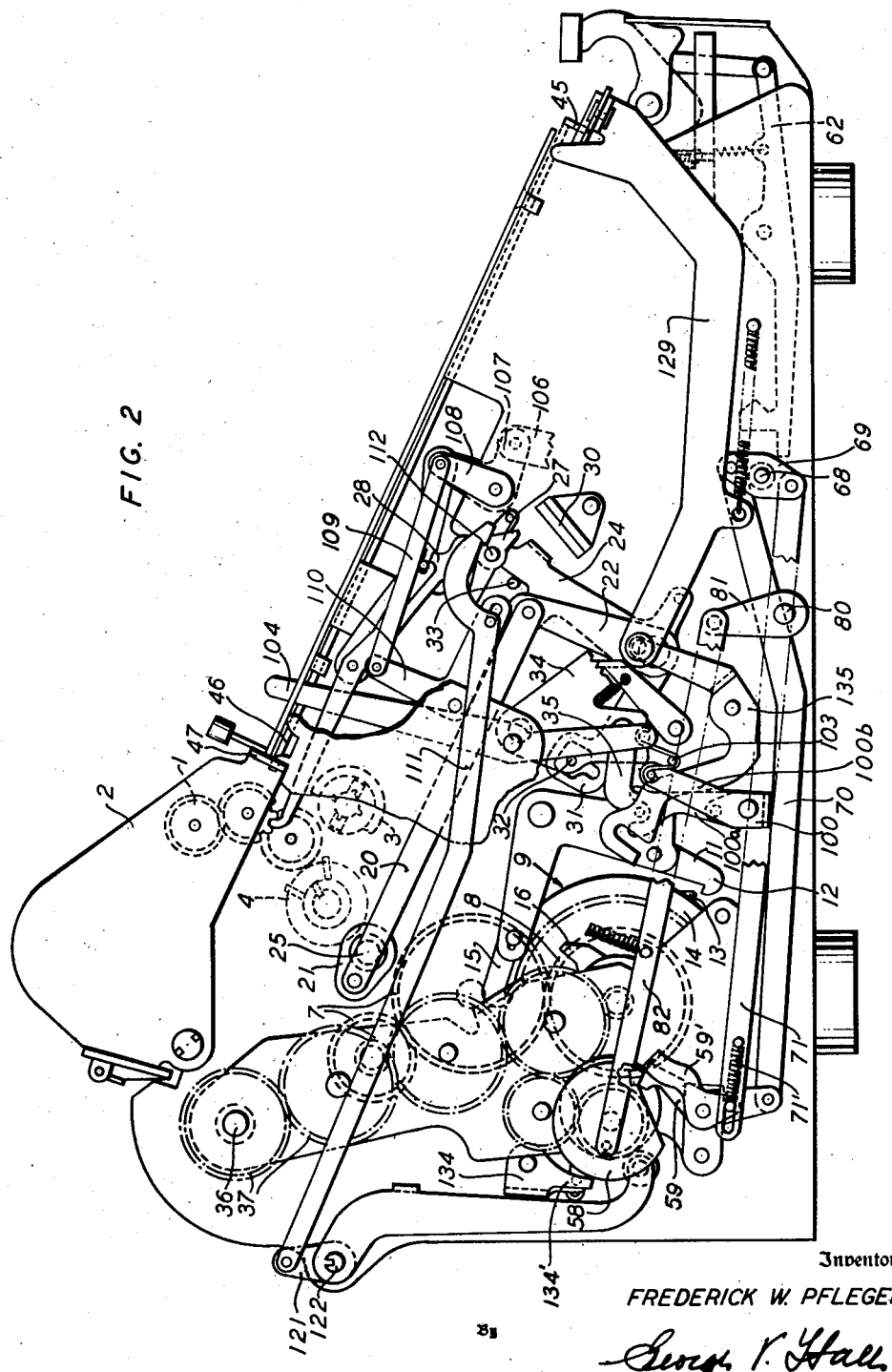

July 14, 1953

F. W. PFLEGER 2,645,423

MULTIPLICATION CONTROL MECHANISM
FOR CALCULATING MACHINES

Filed Jan. 10, 1951

Inventor
FREDERICK W. PFLEGER

By
George V. Hall
Attorney

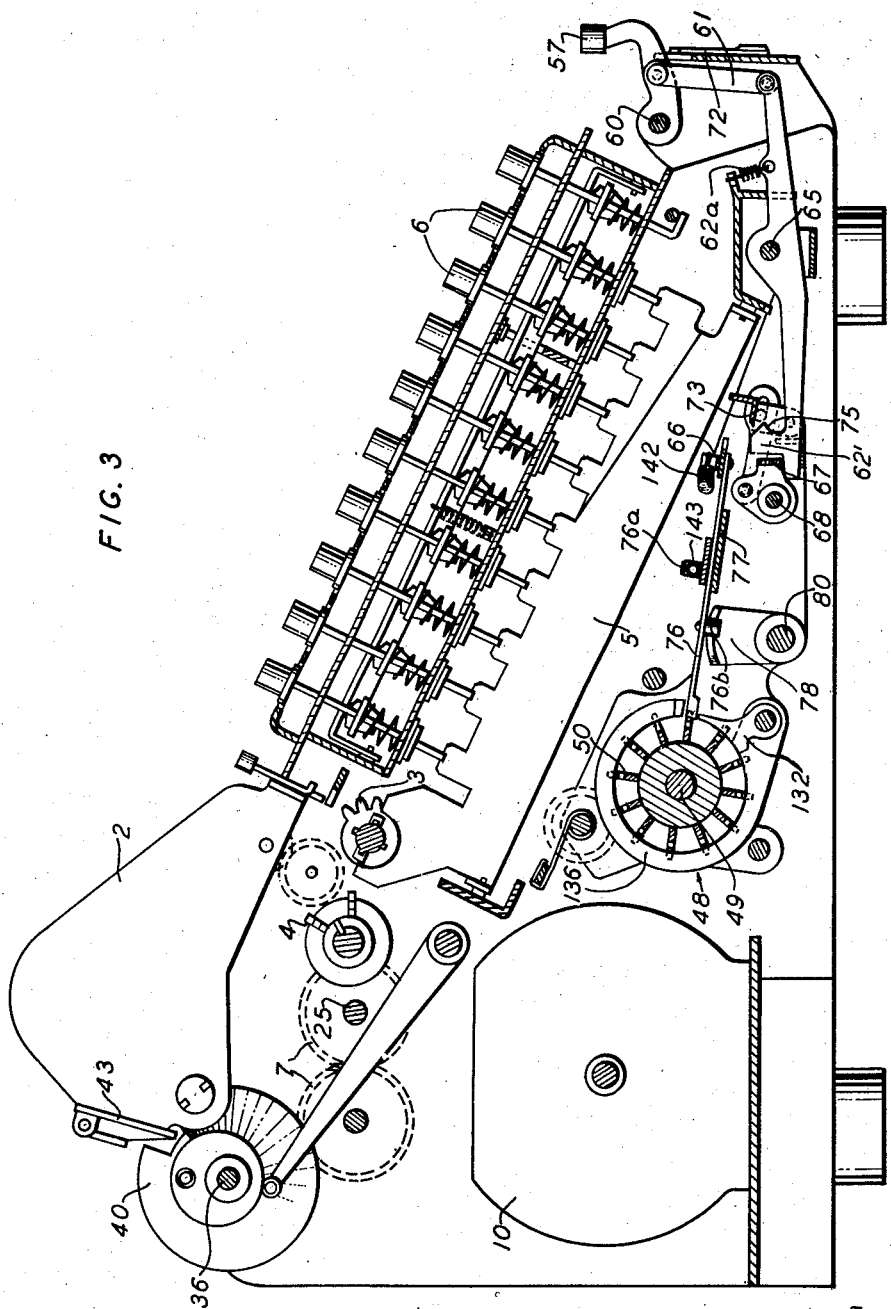

Inventor
FREDERICK W. PFLEGER
George V. Hall
Attorney

July 14, 1953

F. W. PFLEGER 2,645,423

MULTIPLICATION CONTROL MECHANISM
FOR CALCULATING MACHINES

Filed Jan. 10, 1951

Inventor
FREDERICK W. PFLEGER

By

George V. Hall
Attorney

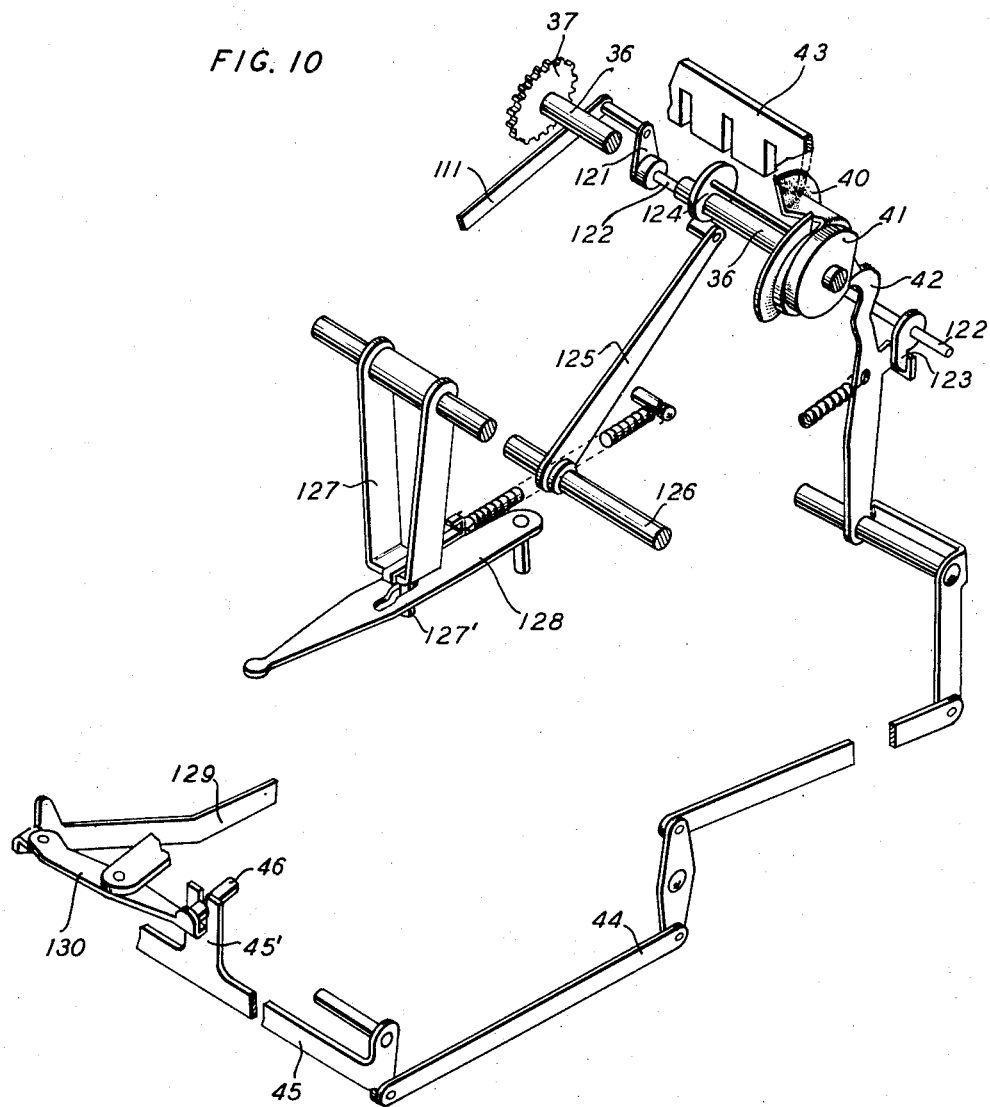

Patented July 14, 1953

2,645,423

UNITED STATES PATENT OFFICE 2,645,423

MULTIPLICATION CONTROL MECHANISM FOR CALCULATING MACHINES

Frederick W. Pfleger, West Orange, N. J., assignor to Monroe Calculating Machine Company, Orange, N. J., a corporation of Delaware Application January 10, 1951, Serial No. 205,304

13 Claims. (Cl. 235—79)

The invention relates to multiplication control means for calculating machines, and more particularly to improvements in control means such as disclosed in the co-pending application 160,154, of Herman Gang, filed May 15, 1950, which is of the same general character as disclosed in the co-pending application 711,253 of Edwin F. Britten, Jr., filed November 21, 1946.

According to the aforenoted disclosures, the multiplication control means comprises a multiplier storage magazine having a series of elements successively settable to represent the successive digits, including zero values, of the multiplier. Each setting operation is followed by an indexing operation of the magazine, thereby moving the storage elements into position for the next setting operation; and the successively set storage elements are utilized in like sequence to control the duration of registration and carriage shift. The multiplying operation is initiated as an incident to the first indexing operation and the following setting and indexing operations may be performed concurrently with the registering and/or carriage shifting operations.

According to the disclosure of application 160,154, reciprocally operable driving connections first set one of a series of digit slides, or alternatively one of an equal number of zero slides, and then index the storage magazine to position the next of the series of digit and zero slides into setting position. The improved storage devices of the present invention distinguish from the structure of said application 160,154 by the utilization of a single series of slides each of which is differentially settable to digit representing positions or alternatively to a zero representing position in lieu of the separate sets of slides for digit and zero multipliers respectively. It will be understood that the term "digit" as hereinafter applied excludes the "zero" and refers only to "one" to "nine." Obviously, the improved arrangement permits a doubling of the number of slides which may be mounted in a given size magazine thereby providing for a greater storage capacity of the magazine if desired. Alternatively, the magazine may be made smaller for a given multiplier capacity, thereby decreasing the inertia of the parts and providing more space for related mechanism. Furthermore, it has been found that the improved arrangement permits a further reduction in the number of parts and a simplification of their operation.

As in said application 160,154, the setting and indexing connections of the invention are operated by an auxiliary clutch which is engaged for a single cycle of operation upon depression of any one of a series of multiplier keys 0 to 9. The keys are depressed in accordance with the successive values of the multiplier digits and the first indexing operation is effective to initiate the multiplying operation, thereby permitting the subsequent setting and indexing operations to be effected concurrently with the calculation. A depressed multiplier key is effective to latch the other multiplier keys against depression and the depressed key is latched against retraction until the completion of the current setting and indexing operations. The operations, however, of the setting and indexing clutch is so rapid that the sequential depression of the succeeding multiplier keys may be effected as rapidly as is normally possible by the operator.

In the accompanying drawings illustrating the invention:

Fig. 2 is a left side elevation of the machine showing the registration control means, the stopping means therefor, and the setting and indexing clutch;

Fig. 3 is a vertical section through the machine showing the registering mechanism and the multiplier storage magazine;

Fig. 9a is a view similar to Fig. 9 with the parts in the position corresponding to the position of the parts shown in Fig. 8a;

Fig. 10 is a fragmentary perspective of the portions of the carriage shift mechanism and devices of the invention related therewith.

REGISTERING OPERATION

Figure 1:
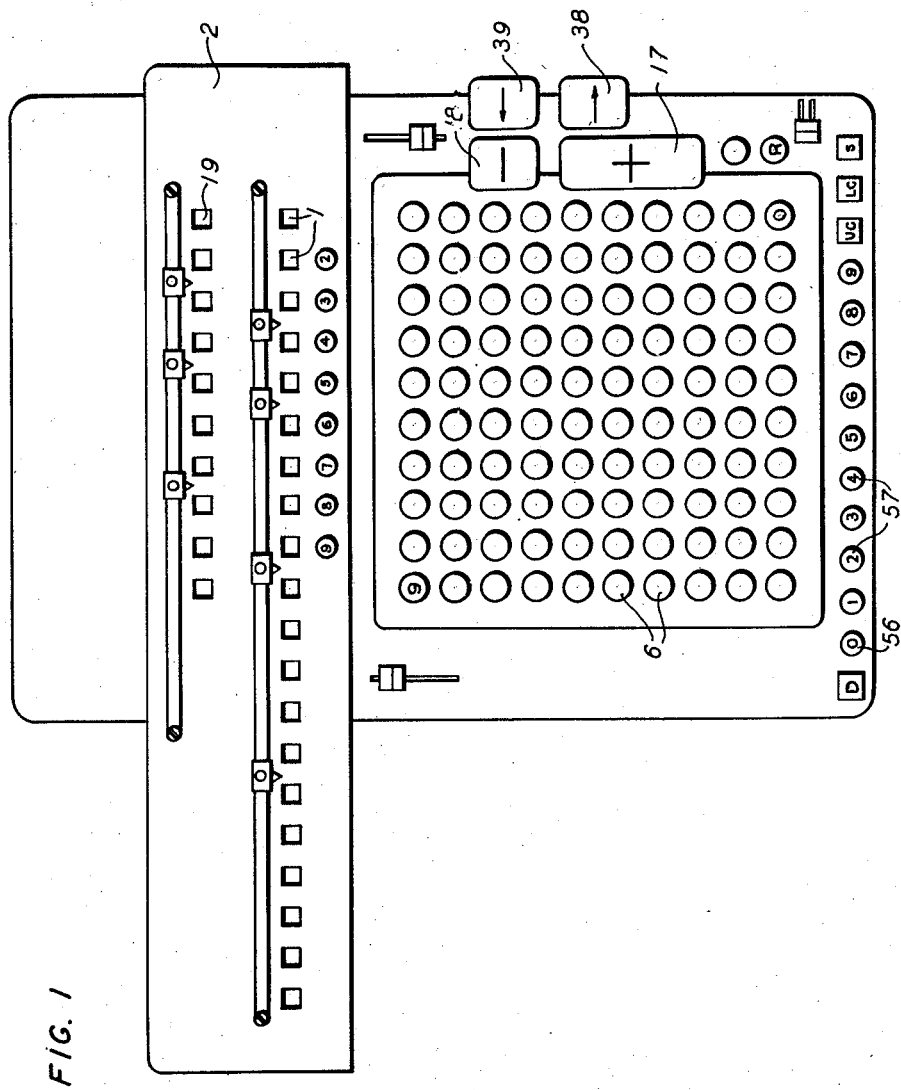
Fig. 1 is a plan view of a calculating machine embodying the invention.

The product dividend register comprising the numeral wheels 1 (Figs. 1 and 2) is mounted in the denominationally shiftable carriage 2. Registration is effected on wheels 1 by cyclically operable actuating mechanism comprising the differentially settable actuators 3 and the tens transfer actuators 4 (Figs. 2 and 3) which are mounted in the base of the machine. The differential actuators 3 are set by selector bails 5 in accordance with depressed settable numeral keys 6 of the keyboard, thereby determining the value registered in wheels 1 upon each cycle of operation of the actuating mechanism.

The differential actuators 3 and tens transfer actuators 4 are driven at a one to one ratio by a gear train 7 from the output gear 8 of the differential clutch mechanism 9 (Fig. 2). The differential clutch mechanism is constructed and transmits power from the motor 10 (Fig. 3) substantially in accordance with the disclosure of U. S. Patent No. 1,566,560, issued to George C. Chase on December 22, 1925. Normally the gearing comprising both working legs of the differential drive rotate idly as described in the aforenoted patent and no movement is transmitted to output gear 8. However, interruption of the movement of one of the legs will cause the planet gears to move in their orbit in one direction accordingly rotating output gear 8 and interruption of the movement of the other leg will cause movement in the other direction and reverse rotation of output gear 8.

The working legs of the differential drive are selectively arrested by means of a reversing clutch lever 11 (Figs. 2 and 2a) which is fulcrumed on the machine frame and settable to neutral, additive and subtractive positions. Clockwise movement of lever 11 will position it to additive setting whereby a hook arm 12 of said lever will engage a lug 13 on gear 14 forming one leg of the differential drive to interrupt its movement, thereby causing rotation of the output gear 8. Conversely, counterclockwise movement will position the lever 11 to subtractive setting whereby a hook arm 15 thereof will engage a stop 16 for the other leg of the differential to interrupt its movement and cause rotation of output gear 8 in the reverse direction. As hereinafter described, the multiplication control mechanism is selectively operable to move clutch lever 11 to one or the other of its active positions to initiate the registering operations of the calculation and is operable to initiate the operation of stopping means (to be described) for moving the clutch lever 11 to neutral position to conclude each of the successive registering operations. Also, depression of the plus and minus bars 17 and 18 (Fig. 1) are adapted to move clutch lever 11 to its additive and subtractive settings respectively and upon release the bars are effective to initiate operation of the stopping means. The controls, however, for these operations which are effected upon manipulation of the plus and minus bars are not shown as they form no part of the present disclosure nor do they have any operating relation therewith.

During each registering cycle of the actuators 3 and 4, a counting finger (not shown) will register a count in one of the numeral wheels 19 of the multiplier-quotient register (Fig. 1). This operation is an incident to the registration of the product in the product register under the control of the devices of the invention and the counting finger and the operating mechanism therefore may be of any well known design, such as that shown in U. S. Patent No. 2,273,237, issued to Edward C. Walter on February 17, 1942.

FULL CYCLE STOPPING MEANS

A rock arm 22 (Figs. 2 and 2a) is fixed at its lower end exteriorly of the left side frame, on shaft 23. Shaft 23 extends across the machine and is journaled in the machine framing for rocking movement with arm 22. Arm 22 has link connection 20 with a crank 21 fixed on a shaft 25 which is driven by the actuator drive train 7 (Figs. 2 and 3) at a one to one ratio with actuators 3 and 4. Therefore, arm 22 will be rocked, from the full cycle position shown in Figs. 2 and 2a, forwardly and return during each operating cycle of the registering mechanism.

A stop arm 24 (Figs. 2 and 2a) is pivotally mounted on shaft 23 adjacent and inwardly of rock arm 22 and is normally biased toward the rear of the machine into engagement with a fixed pin 33 by a spring 24'. Mounted at the upper end of arm 24 is a spring urged pawl 27 which is held in inactive position by a trigger 28. Means hereinafter described in connection with the multiplication control mechanism are operable to raise trigger 28 to initiate operation of the stopping means, thereby terminating each of the successive registering operations of a program of multiplication.

When pawl 27 is released by trigger 28, its rearward free end will be moved downwardly and when the parts move through full cycle position, upon completion of the current operating cycle, released pawl 27 will drop in front of a shoulder 29 (Fig. 2a) of rock arm 22, thus connecting the drive to arm 24. Therefore, arm 24 will be rocked forwardly with arm 22 and into engagement with a fixed stop 30 to prevent further rotation of the parts.

In the movement of arm 24 against stop 30, one or the other of two opposed cam faces of an extension 31 of the arm will engage a pin 32 of a plate 34 which is pivotally mounted on the machine frame and has link connection 35 with clutch lever 11 to provide for movement of either of the connected members in accordance with the other. Clutch lever 11 wil therefore be moved to neutral position with plate 34 upon engagement of pin 32 by the active cam face of extension 31. The parts will then rebound in the reverse direction to full cycle position where they will be arrested by a locator cam (not shown). The locator cam may be of any well known construction, such as disclosed in the aforenoted Patent No. 1,566,560, and may be fixed on any one of the shafts of the machine which have direct driving connection with the actuating mechanism. Furthermore, upon rebound of the parts from stop 30, pawl 27 will be reengaged by trigger 28 which will have been only momentarily raised in the stop initiating operation. Therefore, pawl 27 will be moved to its normal position out of engagement with shoulder 29.

CARRIAGE SHIFTING MECHANISM

The carriage shifting mechanism is constructed and operates substantially in accordance with the disclosure of U. S. Patent No. 1,964,478, issued to Austin A. Overbury on January 26, 1934, to which reference is made for the structural details of the mechanism and its operation.

A pair of reversely threaded worms each provided with a clutch are supported on a shaft 36 (Figs. 2, 3, and 10) which is rotatably mounted in the side frames to the rear of carriage 2. The clutches of like construction are selectively engageable to connect the related worm to shaft 36 which is driven by gear train 37 (Fig. 2) from motor 10, thereby shifting carriage 2 to the right or left respectively. Right and left shift keys 38 and 39 (Fig. 1) are operable to control the engagement of the respective shift clutches. These controls, however, are not shown as they bear no relation to the present invention. Furthermore, only the left shift worm 40 (Figs. 3 and 10) and its clutch 41 are shown as the devices of the invention provided for leftward shift of the carriage in the performance of a program of mutiplication. It will, however, be understood that the devices of the invention are equally applicable to control the shift in either direction.

The shift clutches are of well known construction wherein a spring urged pawl mounted on the driven member engages the driving member to connect the drive. A control detent 42 for the left shift clutch (Fig. 10) is normally spring urged into engagement with the pawl to disengage the clutch, and moved from engagement to permit the pawl to engage the clutch in a manner to be described in connection with the devices of the invention. Shift worm 40, upon rotation, will engage a notched rail 43 (Figs. 3 and 10) which is fixed to the rear of carriage 2, thereby shifting said carriage one decade toward the left upon each cycle of rotation. Upon release, control detent 42 will be spring urged into engagement with the periphery of clutch 41 and when the clutch completes its cycle of operation the detent will engage the clutch pawl to disconnect the drive, thereby terminating the shift.

Means are provided to positively locate carriage 2 in its shifted position. Such means comprises a linkage 44 (Fig. 10) extending from clutch detent 42 to a bail 45 which extends across the front of the machine. A locating rod 46 (Figs. 2 and 10) is engaged at its forward end by an upstanding forked arm 45' of bail 45. Rod 46 extends toward the rear of the machine where its tapered free end normally engages one of the series of notches (not shown) in a rail 47 (Fig. 2) fixed across the front of carriage 2. Upon movement of detent 42 to permit engagement of shift clutch 41, bail 45 will be rocked by linkage 44 and move rod 46 from engagement with the related notch in rail 47, thereby releasing the carriage for the shifting operation. Upon movement of detent 42 to terminate the shift, the tapered end of rod 46 will be moved into engagement with a notch in rail 47, thereby definitely locating the carriage in its shifted position.

AUTOMATIC MULTIPLICATION

Multiplier storage magazine

The product is registered in product-dividend wheels 1 (Figs. 1 and 2) by repeated addition of the multiplicand which is set in the differential actuators 3 by depression of keys 6 of the keyboard. Alternately, however, the machine may be adjusted for subtractive registration whereby negative multiplication will be performed.

A multiplier storage magazine generally designated by the reference numeral 48 (Figs. 3, 4, and 7) and devices operating in conjunction therewith control the program of multiplication, including the initiation of the operation, the registering and carriage shifting operations, and the terminating operation upon completion of the last registering and carriage shifting operations.

The multiplier storage magazine 48 is substantially spool shaped and is axially fixed on a shaft 49. Shaft 49 extends transversely of the machine below selector bails 5 and is journaled adjacent its ends for rotation in the machine framing. As shown, the capacity of the machine allows for the storage of twelve multiplier digits including zeros. The storage elements comprise twelve slides 50 each of which are differentially settable to digit representing positions or alternatively to a zero position. The storage slides 50 are mounted in equidistantly spaced and radially extending slots which are axially aligned about the peripheries of magazine 48. The slides extend longitudinally from either end of the magazine and are radially contained by restraining rings 52 which encircle the slides at each end of the magazine.

When in their normal positions (Figs. 4 and 7) the storage slides 50 represent the digit value of one. Therefore, in a setting operation (to be described) if the digit value is one, no adjustment of the related slide 50 will be effected. If, however, the value entered is a digit of two to nine, the related slide 50 will be adjusted accordingly one to eight steps respectively toward the right from its normal position. If the multiplier digit value is a zero, the setting operation will be effective to move the related slide 50 a fixed distance toward the left from the normal position shown in Figs. 4 and 7. Spring urged balls 53 which are recessed in magazine 48 engage notches on the inward edges of slides 50 to maintain them in adjusted position.

Figure 9:
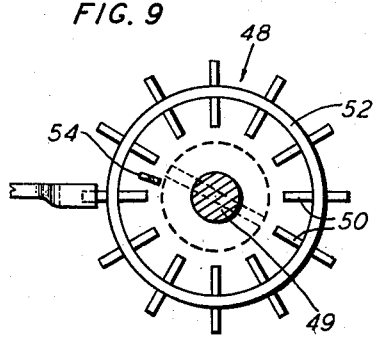
Fig. 9 is a view taken on line 9—9 of Fig. 7 with the parts in the position corresponding to the position of the parts shown in Fig. 8.

After each setting operation, the magazine will be indexed (in a manner to be described) one step in counterclockwise direction (Figs. 3 and 4) thereby moving another slide 50 into setting position. A counting pawl 54 (Figs. 4, 7, 9, and 9a) is rotatably mounted on shaft 49 with its active end in a plane a slight distance to the right (Fig. 7) of unset slides 50 and is normally spring urged clockwise (Fig. 4) counterclockwise (Figs. 9 and 9a) to a home position (Fig. 9). When in home position, pawl 54 is located clockwise (Fig. 9) out of longitudinal alignment with the slide 50 which is in setting position so that the slide may be set toward the right (Fig. 7) without interference from the pawl. During the initial indexing step of magazine 48 in a program of multiplication, the slide 50 which is in setting position will be moved therefrom and into operating relation (Fig. 9a) with pawl 54 which will then be moved with the slide as the magazine completes the indexing movement. As will be described, upon movement of pawl 54 from home position, the program of multiplication will be initiated and the subsequent setting and magazine indexing operations may be effected concurrently with the calculation. Counting pawl 54 is moved with magazine 48 upon subsequent indexing operations and concurrently operates to move the related slide 50 if set to a digit representing position step by step back to normal position and one step beyond to the left (Fig. 7), which movement of the slide terminates the registering operation and initiates a shift of the carriage one decade toward the left to resume the calculation. Escapement means operated in conjunction with the carriage shift releases counting pawl 54 which is spring moved in the reverse direction one step of movement and thus into operating relation with the next set slide 50. Upon movement of pawl 54 into a position in which a slide 50 has been set to zero representing position, a contact member which is rotated in fixed relation with pawl 54 will, in lieu of a registering operation, initiate a one decade carriage shift which will operate to release the counting pawl and the related contact member for reverse movement into operating relation with the next set slide. The calculation will continue concurrently with the multiplier setting and magazine indexing operations until pawl 54 and the related contact member have been moved to the home position at which time the calculation will have been effected more rapidly than the setting and indexing operations or else the product registration is completed. In either instance, the multiplying operation will be concluded but, however, will be resumed upon further multiplier setting and indexing operation. Should a slide be set to zero position while pawl 54 and the related contact member are in home position, the contact member will immediately perform the carriage shift initiating operation; however, the operation of the carriage shifting mechanism will be held in abeyance until the magazine indexing operation is effected. The foregoing briefly summarized operations in connection with the storage magazine and other subsidiary operations are described in detail in the following.

AUTOMATIC MULTIPLICATION

*(Control of the multiplier setting and magazine indexing clutch)*

A row of multiplier keys including a zero value key 56 and digit value keys 57 one to nine (Figs. 1, 4, and 6) are arranged in sequence from left to right across the machine in front of the keyboard. Depression of any one of the multiplier keys will engage a clutch 58 (Fig. 2) for a single cycle of operation. Clutch 58, upon each cycle of operation, will store the value of the depressed multiplier key in magazine 48 and index the magazine for another setting and indexing operation. In the embodiment of the invention as shown, carriage 2 is shifted toward the left in the performance of the program of multiplication. The multiplier keys 56, 57, indicating respectively the zero multiplier values and the values of the multiplier digits to be entered in the magazine are, therefore, depressed in sequence from the highest to the lowest order values.

Figure 4:
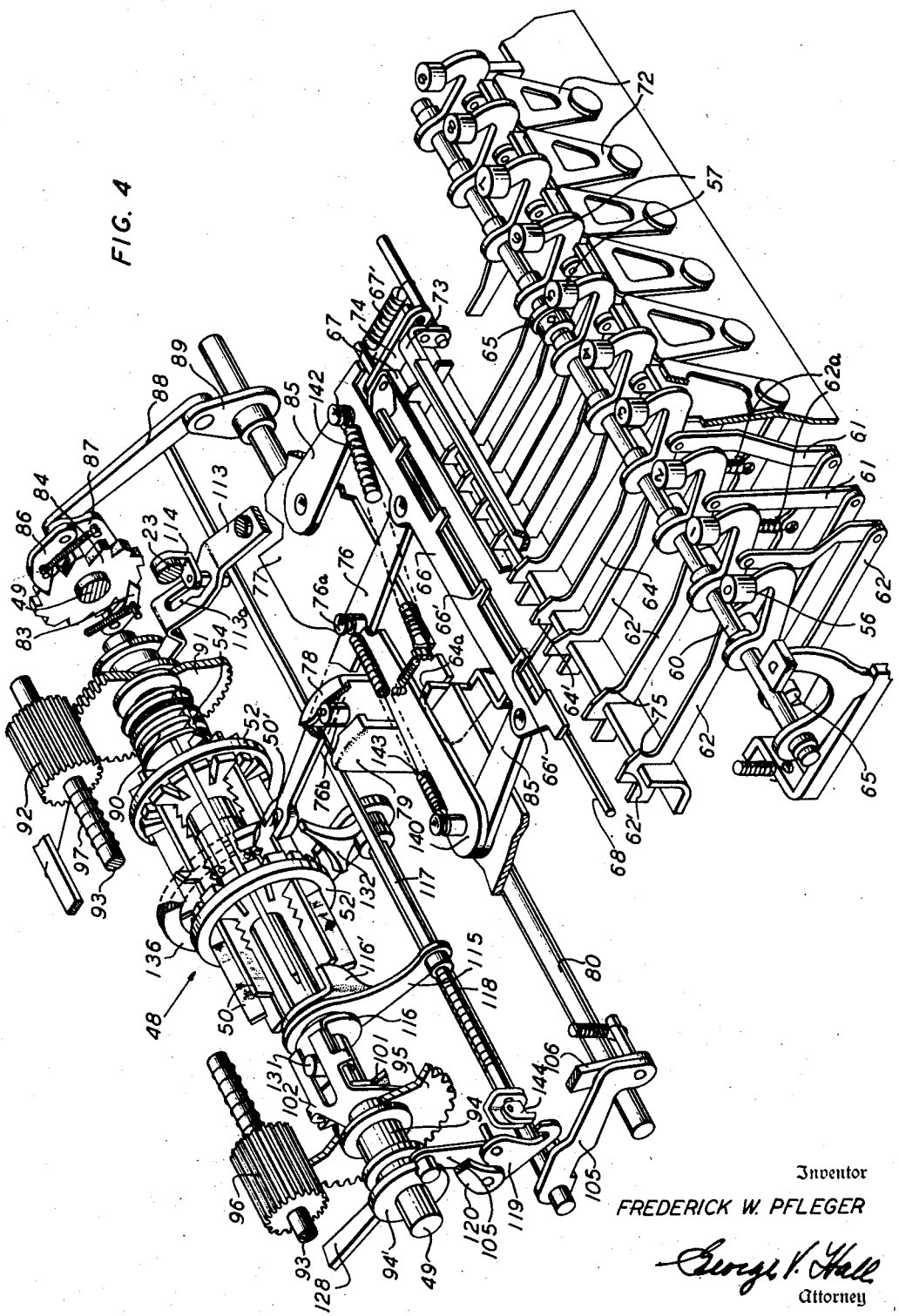
Fig. 4 is a perspective view of the multiplier storage magazine and the controls therefor.
Figure 6:
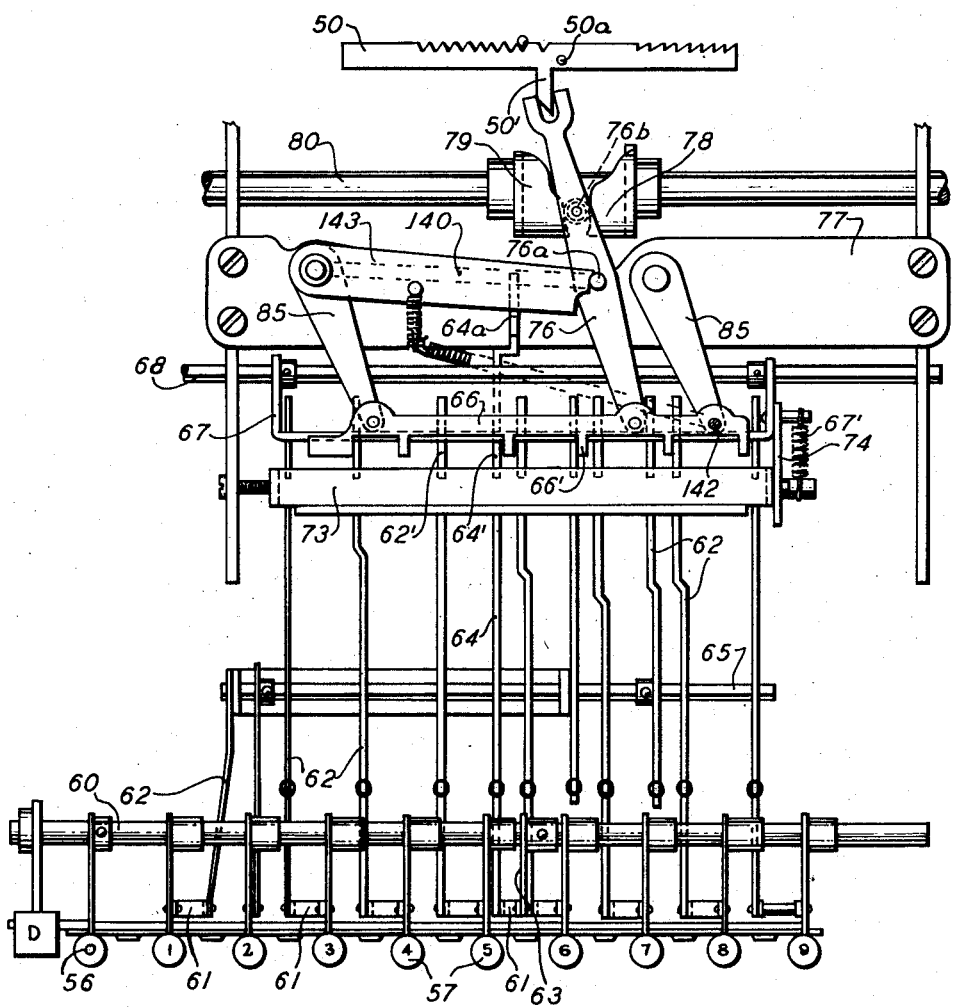
Fig. 6 is a plan view of the selection mechanism for the multiplier storage magazine.

Clutch 58 (Fig. 2) is of well-known construction in which a spring urged pawl mounted on the driven member of the clutch is engaged by a detent 59 to disengage the clutch. The clutch is engaged by movement of the detent 59 to release the pawl which will then engage the driving member of the clutch, thereby connecting it with the driven member. Detent 59 is rocked clockwise (Fig. 2) to engage clutch 58 upon depression of the zero value key 56 or any one of the digit value keys 57 and, upon release of the depressed key, the detent will be urged against the periphery of the clutch to engage the clutch pawl upon completion of the cycle to disengage the clutch. Clutch 58 must be limited to one cycle of operation upon depression of each of the multiplier keys. The action, however, of clutch 58 is so rapid that the operator is usually unable to release the multiplier key before the clutch has completed its cycle. Therefore, an auxiliary detent 59' is spring urged into engagement with the periphery of clutch 58 upon movement of detent 59 to engage the clutch. The control of the operation of detents 59, 59' by multiplier keys 56, 57, is as follows:

The zero value key 56 and the one to nine value multiplier keys 57 have horizontally disposed stems (Figs. 3, 4, and 6) which are mounted at their rearward ends on a shaft 60 extending across the machine and rotatably mounted in the side frames. The stems of keys 57 are freely mounted on shaft 60 and intermediate their ends the key stems have depending link connections 61 with the forward ends of digit selection levers 62. The stem of zero key 56 is fast on shaft 60 and a forwardly extending arm 63, also fast on the shaft, has depending link connection with the forward end of a zero selection lever 64 (Figs. 4 and 6). Selection levers 62, 64 are mounted on shaft 65 which is journaled in the machine framing, and are arranged with relation to a selection comb 66 (to be described) in a manner to control the multiplier value entered in magazine 48 upon operation of clutch 58. Selection levers 62, 64 are not arranged in progressive sequence from left to right as are the multiplier keys. As shown, this is necessary to properly relate the selection levers to the comb 66 and appropriate cross-over connections are provided to connect zero key 56 and digit value keys 57 by the depending links 61 to the related selection levers 64 and 62 respectively. It will be understood, however, that considerable latitude may be used in the design and arrangement of the parts without departing from the general operating principles. Upon depression of the zero key 56 or any one of the digit value keys 57, the connected selection lever 64 or one of the levers 62 respectively will be rocked in clockwise direction (Figs. 3 and 4), thereby raising the rear free end of the lever which movement operates to engage clutch 58 in the following manner.

The free rear ends of selection levers 62, 64 underlie the lower edge of a bail 67 (Figs. 3, 4, and 6) which extends transversely of the machine. Rearwardly extending arms of bail 67 are fixed on a shaft 68 which is rotatably mounted in the machine framing and extends outwardly from the left side frame (Fig. 2). Therefore, when a selection lever 62, 64 is rocked upon depression of a multiplier key, the free rear end of the lever will engage bail 67 and rock said bail and shaft 68 to which it is fixed in counterclockwise direction against the tension of a spring 67' (Fig. 4) attached to the right end of the bail. Outwardly of the left side frame, a crank 69 (Fig. 2) with diametrically disposed arms is fixed at the end of shaft 68. The upper arm of crank 69 has link connection 70 with detent 59 of clutch 58 and the lower arm of the crank has yieldable link connection 71 with the auxiliary detent 59'. Crank 69, which will be rocked with shaft 68, will therefore move link 70 toward the rear of the machine and rock detent 59 clockwise to engage clutch 58. At the same time, crank 69 will move link 71 toward the front of the machine, thereby rocking detent 59' counterclockwise into engagement with the periphery of clutch 58 and tensioning a spring 71' which comprises the yieldable connection of the link with the detent. Therefore, if a multiplier key is held manually depressed, thus holding crank 69 in operated position until clutch 58 approaches full cycle position, detent 59' will be moved inwardly to a cut-away portion of the clutch housing and thereby engage the clutch pawl to disengage the clutch. Upon release of the depressed multiplier key, the connected one of the digit value selection levers 62 or the zero selection lever 64 will be moved to normal by a return spring 62a (Figs. 3 and 4) with which each lever is provided and the key will therefore be raised to normal by the connecting linkage. Bail 67 will now be allowed movement to normal by spring 67' (Fig. 4) and thus crank 69 will be rocked clockwise to the normal position shown in Fig. 2. Accordingly, link 70 will move detent 59 to clutch disengaging position and link 71 will move detent 59' to clutch engaging position. Clutch 58, however, will remain disengaged as a slight step of movement of the clutch will bring its pawl into contact with detent 59.

Upon depression of the zero key 56 or one of the digit value keys 57, provision must be made to prevent the depression of another of the multiplier keys until clutch 58 has completed its cycle of operation. This is necessary as the storage of only one multiplier digit in magazine 48 may be effected upon each cycle of operation of the clutch and, furthermore, the operation of the selection mechanism would be disorganized. Therefore, latching means prevents the retraction of a depressed multiplier key, if manually released, until clutch 58 completes its cycle of operation; and the latched down key, in turn, operates a series of latch plates 72 (Fig. 4) to prevent the depression of any other of the multiplier keys.

Latching plates 72 are pivotally mounted at their lower ends and the upper horizontal edges of the plates are disposed just below the stems of multiplier keys 56, 57. The upper edges of plates 72 extend adjacent one another leaving a slight gap between the plates below the multiplier key stems. The spacing of plates 72 is such that upon depression of a multiplier key, its stem will pass between two of the plates, thereby moving the plates and closing the gaps between all other of the plates; thus latching any other of the multiplier keys against depression.

A depressed multiplier key 56, 57, if released before clutch 58 completes its cycle, will be restrained against retraction by a latching bail 73 (Figs. 3, 4, and 6) until the cycle is completed. Latching bail 73 has pivotal mounting in the machine framing and at its right end the bail has pin and slot connection with a link 74 which is attached at its rear end to bail 67. Bail 73 extends above and across the digit value selection levers 62, 64 inwardly of their free ends and is adapted to engage the latching shoulders 75 with which each of the selection levers is provided. When bail 67 is rocked by a selection lever 62 or 64 the pin and slot connection in link 74 will permit the shoulder 75 of the lever to be raised above the rear edge of bail 73. However, as bail 67 completes its movement, link 74 will be effective to rock bail 73 in counterclockwise direction (Figs. 3 and 4) thereby moving the rear edge of the bail beneath shoulder 75, thus holding the selection lever rocked and the multiplier key depressed. The action of detent 59 (Fig. 2) will prevent bail 67 from movement to normal until clutch 58 (Fig. 2) has completed its cycle. Detent 59, upon release of the depressed multiplier key, will be moved only a slight distance and then will be restrained by engagement with the periphery of clutch 58 until the clutch approaches full cycle position. Therefore, crank 69 and bail 67 will be held in rocked position and the depressed multiplier key latched against retraction by bail 73 until detent 59 moves inwardly to disengage clutch 58 at the end of its cycle.

AUTOMATIC MULTIPLICATION

(Setting and indexing operations)

Means reciprocally driven by clutch 58 controls the operation of setting means to enter a value in magazine 48 in accordance with a depressed multiplier key, and to then index the magazine into position for another setting and indexing operation.

It will be recalled that no adjustment of a differentially settable slide 50 (Figs. 4, 6, and 7) is required for storage of the digit value one in magazine 48. Therefore, a lever 76 is rocked clockwise (Figs. 4 and 6) to adjust a slide 50 which is in setting position one to eight steps of movement toward the right representative of the digit values two to nine respectively. Conversely, lever 76 is rocked counterclockwise to adjust the slide 50 a predetermined distance toward the left for the storage of a zero multiplier. Lever 76 is pivotally connected at its forward end to comb 66 and intermediate its ends it is freely supported by a fixed plate 77. Therefore, lever 76 may be swung about its pivotal connection with comb 66. Comb 66 has pivotal mounting at its respective ends on the forward ends of a pair of arms 85 which have pivotal mounting at their rearward ends on plate 77. An arm 140 having common pivotal mounting with the left arm 85 is spring biased to normal clockwise position (Figs. 4 and 6) wherein said arm 140 is engaged by a cam end 64a of zero selection lever 64. The right free end of arm 140 comprises a pair of stepped treads the rightmost of which engages a stud 76a on lever 76 intermediate its ends when said arm 140 is in normal clockwise position. A pair of opposed cam arms 78 and 79 engage a roller 76b (Figs. 3 and 4) on the under face of lever 76 intermediate stud 76a and the lever's forked rear end. A spring 142 attached at the point of connection of comb 66 with right arm 85 biases comb 66 toward the left of the machine to thereby impart clockwise movement to lever 76 with stud 76a as a pivot. Comb 66 and lever 76, however, are normally restrained from such movement by cam 78 engaging roller 76b on the lever. Conversely, a spring 143 attached to stud 76a biases lever 76 in counterclockwise direction about its pivotal point of connection with comb 66. Arm 140, however, engaging stud 76a and cam 79 engaging roller 76b normally restrains lever 76 from such movement.

Cam arms 78 and 79 are fixed on a shaft 80 which is journaled in the machine framing and extends outwardly (Fig. 2) from the left side frame. An upstanding crank 81 is fixed at the left end of shaft 80 and has link connection 82 with the driven housing of clutch 58. Therefore, upon each cycle of operation of clutch 58, crank 81, shaft 80, and cam arm 78, 79 will be rocked in clockwise direction (Figs. 3 and 4) and return. The setting operation will be performed upon said clockwise movement of cam arms 78, 79 whereupon setting lever 76 will be released for clockwise or alternatively counterclockwise movement and upon the return movement of shaft 80 and cam arms 78, 79 the magazine indexing operation will be performed and lever 76 will be restored to normal.

As best seen in Figs. 4 and 6, the forked rear end of lever 76 engages a lug 50' of the differentially settable slide 50 which is in setting position. Magazine 48 is definitely located in its indexed positions by a holding pawl 83 (Fig. 4) engaging a tooth on a ratchet 84 which is fixed on supporting shaft 49 on which the magazine is fixed. As hereinafter described, magazine 48 is indexed counterclockwise (Figs. 3 and 4) and is never restored but remains in the last position to which it is indexed. The setting and indexing operations will first be described in connection with the operation of setting lever 76 upon repression of multiplier keys 57 which represent the digit values one to nine.

Upon depression of a multiplier key 57, an upstanding lug 62' (Figs. 3 and 4) of the rocked selection lever 62 will be raised into operating relation with one of the teeth 66' of selection comb 66. Upon the attendant operation of clutch 58 and the consequent rocking of cam arm 78, setting lever 76 will be released for clockwise movement (Figs. 4 and 6) about stud 76a as a pivot. Spring 142, therefore, will move comb 66 to the left a distance wherein the comb is blocked from further movement by engagement of the related tooth 66' thereof with the lug 62' of a selection lever 62 which is rocked upon depression of a digit multiplier key 57; and setting lever 76 will be rocked clockwise to set the related slide 50 in accordance with the movement afforded comb 66. The arrangement is such that if the key 57 representing the digit value of one is depressed, the lug 62' of the rocked lever 62 will be raised into a position a very slight distance to the left and into the path of movement of one of the teeth 66' of comb 66. Therefore, when lever 76 is released by cam arm 78, no appreciable movement will be afforded said lever for the reason that comb 66 will be restrained from movement toward the left by engagement of the tooth 66' with lug 62' and the related storage slide 50 will remain in normal position which is representative of the digit value one.

If, however, one of the keys 57 representative of one of the digits two to nine is depressed, the lug 62' of the rocked lever 62 will be moved into position to the left of a tooth 66' of comb 66 a distance which will permit the forked end of released lever 76 to move the engaged slide 50 one to eight steps of movement to the right representative of the digits two to nine respectively. It will be noted that the lever 62 which is rocked by the nine multiplier key 57 is without a restraining lug 62', and in setting of the digit nine, the slide 50 will be adjusted the maximum distance of eight steps which adjustment is controlled by a pin 50a (Fig. 7) on the slide engaging the flanged right end of magazine 48.

An indexing pawl 86 (Fig. 4) is mounted on an arm 87 which is pivotally mounted on shaft 49 to the right of ratchet wheel 84. Pawl 86 engages a tooth of ratchet 84 and arm 87 has link connection 88 with an upstanding crank 89 which is fixed on rock shaft 80. When shaft 80 is rocked clockwise by the setting operation of clutch 58, pawl 86 will be rocked in the same direction by the connecting linkage and thus moved one tooth space on stationary ratchet 84. Therefore, when shaft 80 is rocked counterclockwise to normal by clutch 58, pawl 86 will be effective to index ratchet 84, shaft 49, and magazine 48 one step of movement in a counterclockwise direction (Figs. 3 and 4).

During the first part of the indexing step of magazine 48, the lug 50' of the set slide 50 will be moved from engagement with the fork end of setting lever 76. Cam arm 78 in its return movement will then engage roller 76b of lever 76 and move said lever to normal position (Figs. 4 and 6) just prior to the completion of the indexing of magazine 48. As magazine 48 completes its movement, the lug 50' of the next slide 50 in the series will be moved within the forked end of setting lever 76.

AUTOMATIC MULTIPLICATION
*(Initiation of the program)*

Figure 9A:
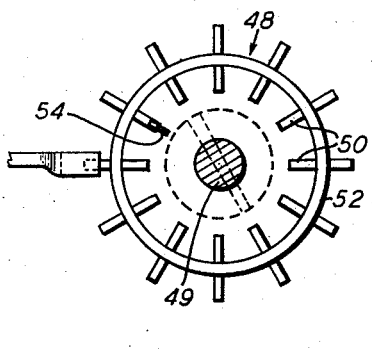

As an incident to the first indexing step of magazine 48, the set digit slide 50 will be moved from the position shown in Fig. 9 into operating relation with the counting pawl 54 as shown in Fig. 9a, and certain adjustments of the machine will be effected and the multiplying program will be initiated as follows:

Pawl 54 is mounted in a longitudinal slot in a sleeve 90 (Figs. 4 and 7) which is rotatably and slidably mounted on shaft 49 to the right of magazine 48. A gear 91 is integral with sleeve 90 and meshes with a gear 92 which is fixed on a shaft 93 journaled in the machine framing in parallel relation with magazine 48. To the left of magazine 48 and also rotatably and slidably mounted on shaft 49 is a second sleeve 94 having a gear 95 integral therewith. Gear 95 meshes with a gear 96 which is fixed on shaft 93. The gears 92, 96 are of such a width that the gears 91, 95 respectively are allowed considerable longitudinal movement on shaft 49 and still maintain mesh with the respective gears. A torsion spring 97 (Figs. 3, 4, 7) has one end attached to shaft 93 and the other end to the machine framing. Torsion spring 97 urges shaft 93 and gears 92, 96 fixed thereon in counterclockwise direction (Fig. 4). Gears 92, 96 therefore urge gears 91, 95 and counting pawl 54, which are in fixed rotational relationship, in a clockwise direction on shaft 49.

Figure 7:
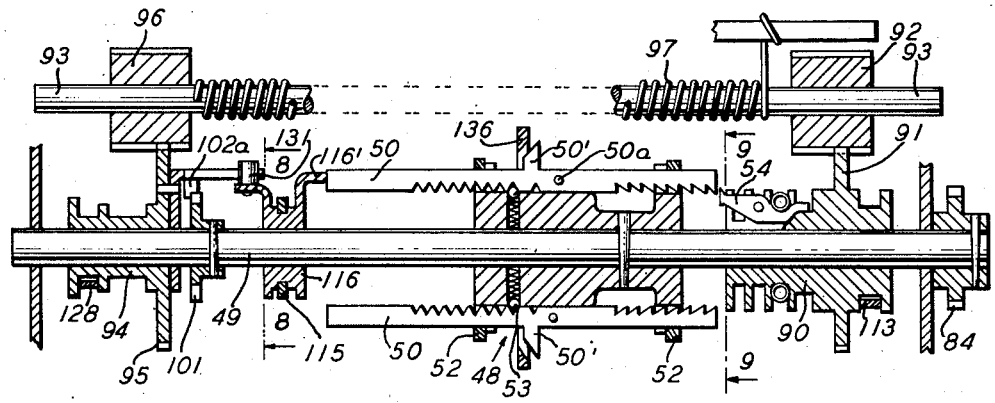
Fig. 7 is a longitudinal section through the multiplier storage magazine.
Figure 8:
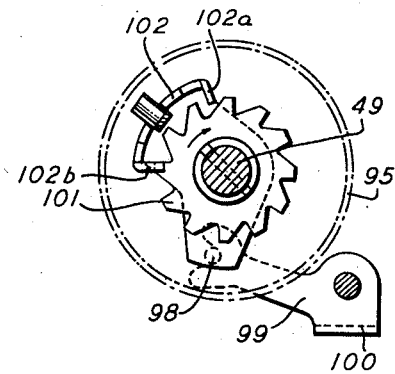
Fig. 8 is a view taken on line 8—8 of Fig. 7 looking in the direction of the arrows.
Figure 8A:
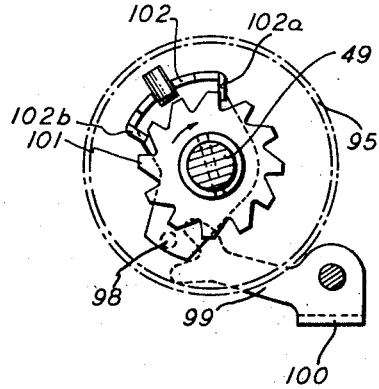
Fig. 8a is a view similar to Fig. 8 with the parts in another position.

When the machine is in a normal position of rest, gears 91, 95, and pawl 54 are urged to a home position by spring 97 and are so located and restrained from further clockwise movement by a pin 98 (Figs. 5 and 8) on the outer face of gear 95 engaging the forked end of an arm 99 of a bail 100. When in this position, counting pawl 54 is located in a longitudinal plane intermediate that of the slide 50 which is in setting position and the next slide clockwise therefrom as shown in Fig. 9. When slides 50 are in unset position, the active end of the pawl is located in a vertical plane a slight distance to the right ends (Fig. 7). Pawl 54, therefore, will be out of the longitudinal path of movement of the slide 50 which is in setting position and will not interfere with the setting movement of the slide.

Magazine 48 will be independently moved in the initial indexing operation a distance equal to the clockwise displacement (Fig. 9) of the pawl 54 thereby bringing the set slide 50 into longitudinal alignment with said pawl which at this time is in home position. However, during the completion of the initial indexing operation the pawl and magazine will be moved together, thus maintaining the set slide 50 and said pawl in operating relationship as shown in Fig. 9a. When pawl 54 is moved from home position, the parts entrained therewith will be moved accordingly and this movement effects the aforenoted adjustments of the machine and initiates the multiplying operation. The devices effecting the above operations are constructed and operate as follows:

An escapement wheel 101 (Figs. 4, 5, 7, 8, and 8a) is fixed on shaft 49 to the right of gear 95. Fixed on the inner face of gear 95 adjacent wheel 101 is an escapement pallet 102 which is therefore in fixed rotary relation with counting pawl 54. Pallet 102 comprises arms 102a and 102b. When the parts are in normal home position, arm 102a is in the path of movement of one of the teeth of escapement wheel 101 and is angularly displaced from said tooth equally to the angular displacement of counting pawl 54 from the slide 50 which is in setting position; and arm 102b is positioned to the right and out of the path of movement of the teeth of the escapement wheel. Therefore, when magazine 48 has been moved, in the initial indexing operation, the distance sufficient to bring the set slide 50 into alignment with counting pawl 54, a tooth of wheel 101 will engage arm 102a of pallet 102, thereby moving entrained gears 96, 92, 91, and counting pawl 54 with magazine 48 during the remainder of the initial indexing movement. Upon subsequent indexing movements, wheel 101, through pallet arm 102a, will be effective to move counting pawl 54 a full step of movement with magazine 48 unless said pawl has been returned reversely to home position, as later described, in which instance the above described operations will be repeated upon depression of a multiplier key.

Upon movement of gear 95 and the consequent movement of pin 98 from engagement with the forked end of arm 99 of bail 100, said bail will be operated to move clutch lever 11 (Figs. 2 and 2a) and initiate a registering operation of the multiplying program. Bail 100 extends to the outside of the left side frame and is thereat provided with an upstanding arm 100a having a forked free end which embraces a pin 11a (Figs. 2a and 5) on clutch lever 11. The prongs of the forked arm 100a are so spaced that normally clutch lever 11 may be moved in other registering operations to its active positions without interference. Attached to and extending outwardly from arm 100a is a second upstanding arm 100b. Arm 100b has toggle spring connection 103 (Fig. 2) with a two position lever 104. When lever 104 is in the counterclockwise position shown in Fig. 2, toggle spring 103 biases bail 100 in counterclockwise direction. Normally bail 100 is held in central inactive position by pin 98 engaging the fork 99 of the bail. However, when pin 98 is removed from fork 99 during the initial indexing operation, toggle spring 103 will be effective to rock bail in counterclockwise direction (Figs. 2 and 5) and fork arm 100a will engage pin 11a, thereby rocking clutch lever 11 clockwise and effecting additive operation of the registering mechanism. If lever 104 is set clockwise from the position shown in Fig. 2, toggle spring 103 will bias bail 100 in the reverse direction, thereby providing for negative registration upon release of the bail by pin 98.

Carriage shift control mechanism will be conditioned upon movement of gear 95 from home position and the resulting initiation of the multiplying operation. At the left end and integral with sleeve 94 and gear 95 is a flange 94' (Fig. 4) having a cam depression in its periphery. When the parts are in normal position (Fig. 4) a roller on one arm of a spring urged bell crank 105 engages the cam depression of flange 94'. The other arm of bell crank 105 has link connection 106 with one arm of a bell crank 107 (Fig. 2) which has pivotal mounting on the inner face of the left side frame. An upstanding crank 108 at the outside of the left side frame is connected for movement with bell crank 107 by a common pivotal mounting on which both of the cranks are fixed. Crank 108 has link connection 109 with the upstanding arm of a bell crank 110, the other arm of which has slot and pin connection with the forward end of shift control link 111. Therefore, upon movement of flange 94' with gear 95 from home position, crank 105 will be rocked clockwise (Fig. 4) by action of the cam depression in the flange and through the connecting linkage, the forward end of shift link 111 (Fig. 2) will be lowered, thus moving a shoulder at the under forward end of the link into position in front of a pin 112 on stop arm 24. This adjustment constitutes the conditioning of the shift control mechanism.

AUTOMATIC MULTIPLICATION

*(Registering and carriage shifting operations)*

The duration of the individual successive registering operations constituting the program will be controlled by pawl 54 (Figs. 4, 7, 9, and 9a) operating with successively set slides 50 in like succession, and each of the individual registering operations will be followed by a carriage shift of one decade toward the left until the last registering operation, which is followed by a carriage shift, is effected. As heretofore noted, after the multiplying program is initiated, the successive multiplier digit setting and magazine indexing operations will be effected concurrently with the calculation unless the machine runs ahead of the operator, in which case the machine will come to rest and then be restarted upon depression of another multiplier key.

The differentially settable slides 50 (Fig. 7) each have on their inner edges eight tooth spaces representative of the digits two to nine and equidistantly spaced from the right ends of the slides. As heretofore noted, if a digit value of one is stored in magazine 48, no adjustment is made of the controlling slide 50. Therefore, when the slide is moved into alignment with counting pawl 54, the left active end of the pawl will be positioned a slight distance from the right end of the slide, as shown in Fig. 7. If the stored digit is two, pawl 54 will engage the first tooth space from the end of slide 50, etc. Upon each registering cycle of the machine, pawl 54 will be longitudinally reciprocated toward the left from the position shown in Fig. 7 a distance of one tooth space of slides 50 and return. Therefore, a set slide 50 engaged by pawl 54 will be moved one step to the left toward its normal position upon each registering cycle of the machine and when restored to its normal position, pawl 54 upon the following registering cycle will engage the end of the slide and move said slide to the left one step beyond its normal position. The movement of a slide 50 the step beyond its normal position is adapted to terminate the registration at the end of the current registering cycle. Therefore, if the digit multiplier is one, pawl 54 will engage the end of the aligned slide 50 during the first registering cycle, thereby terminating the registration, and if the pawl engages the first tooth space of the slide, it will engage the end of the slide during the second registering cycle, etc. The devices for driving the pawl 54 and for terminating the registrations are as follows:

Sleeve 90 (Figs. 4 and 7) on which pawl 54 and gear 91 are mounted has an annular groove to the right of the gear. An arm 113 (Figs. 4, 7) is pivotally mounted for reciprocation in a horizontal plane and the rear end of the arm engages the annular groove of sleeve 90. Shaft 23, to which rock arm 22 is fixed (Fig. 2a), extends across the machine above arm 113 and a depending arm 114 (Fig. 4) fixed on shaft 23 carries a drive pin which engages a cam slot 113a in arm 113. As arm 22 is rocked upon each registering cycle of the machine, shaft 23 will rock arm 114 and the pin thereon will reciprocate the rear end of arm 113 to the left and return.

Sleeve 90 will therefore be reciprocated by arm 113 and pawl 54 mounted on the sleeve will feed the aligned slide step by step toward the left and one step beyond to stop the registration. It will be noted that gear 91 mounted on sleeve 90 will be moved longitudinally with the sleeve, but will remain in mesh with gear 92. Therefore, subsequent multiplier setting and magazine indexing operations may be effected concurrently with the registration as pawl 54 may be rotated with magazine 48 at the same time it is longitudinally reciprocated. When the slide 50 aligned with pawl 54 is stepped back one step past its normal position, the registration will be terminated as follows:

A collar 116 (Figs. 4, 5, and 7) is mounted for rotational and axial movement on shaft 49 to the left of the ends of slides 50. The collar 116 has slot and pin driving connection 131 with pallet 102 which, as heretofore described, is fixed on gear 95. Collar 116, therefore, has fixed rotary relation with counting pawl 54 through gears 95, 96, 92, and 91. A cam lug 116′ extends to the right of collar 116 and terminates a slight distance to the left of the plane of the left ends of slides 50 when said slides are in normal unset positions. Cam lug 116′ extends circumferentially in a position where it will be engaged by a slide 50, if said slide is aligned with and moved to the left of its normal position by pawl 54, and in which position the next slide 50 clockwise therefrom (Fig. 4), if moved toward the left in a zero setting operation (to be described), will miss said lug.

A plate 115 (Figs. 4 and 7) is mounted in a circumferential slot on collar 116 and is therefore adapted for longitudinal movement with the collar on shaft 49. However, plate 115 is restrained from rotational movement by an integral arm extending therefrom and fixed at its end on a shaft 117. Shaft 117 extends across the machine and is slidably mounted in the machine framing (not shown). A compression spring 118 on shaft 117 engages a collar on the shaft and the machine framing thereby urging shaft 117, plate 115, and collar 116 to their normal position toward the right, which position is determined by a fixed stop (not shown).

Figure 2A:
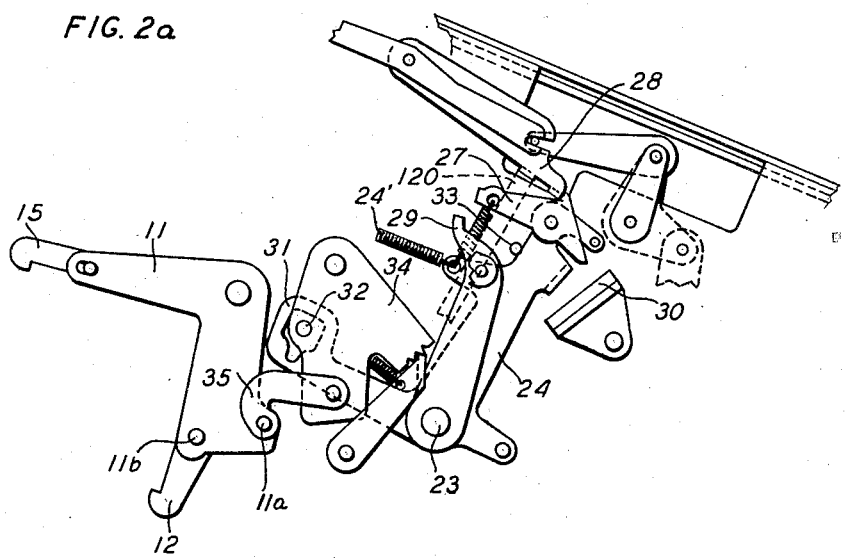
Fig. 2a is a detail elevation of certain parts shown in Fig. 2.

A unidirectional trip pawl 144 is mounted on the left end of shaft 117. The cam end of trip pawl 144 is positioned to the right adjacent the right arm of a lever 119 which is pivotally mounted inwardly of the left side frame. The lower end of a push rod 120 is pivotally attached at the end of the left arm of lever 119 and extends upwardly in suitable guides on the inner side of the left side frame. As shown in Fig. 2a, a lug on the under edge of trigger 28 extends inwardly through an opening in the left side frame and the upper free end of push rod 120 (shown in dotted lines) underlies the lug. Upon movement of a slide 50 by counting pawl 54 one step to the left beyond its normal position, the left end of the slide will engage lug 116′ thereby moving collar 116, plate 115, rod 117, and the cam end of trip pawl 144 to engage and rock lever 119 clockwise (Fig. 4). Push rod 120 will therefore be raised by lever 119 and trigger 28 will be raised by the upper end of the push rod, thereby releasing pawl 27 and terminating the registration as described in connection with the registering mechanism. In its return reciprocatory movement, counting pawl 54 will release the related slide 50 and spring 118 will restore shaft 117, plate 115, collar 116, and slide 50 to its normal position. Trigger 28 will therefore be released and upon rebound of stop arm 24 from stop 30, pawl 27 will be reengaged by the trigger. It will be noted that pawl 144 in the aforedescribed tripping operation is moved only far enough for its cam end to engage and rock lever 119. However, in a tripping operation hereinafter described in connection with a zero multiplier, pawl 144 is moved far enough to rock and then pass beyond lever 119.

The operation of the registration terminating means will initiate a one decade carriage shift, the carriage shifting operation will operate escapement 101, 102 (Figs. 4, 5, 8, and 8a), to release counting pawl 54 for one step of reverse movement thereby adjusting said pawl into alignment with the next digit slide 50 and upon termination of the carriage shifting operation, clutch lever 11 will be again moved to active position to start the registering operation in the next order as follows:

Upon movement of arm 24 (Figs. 2 and 2a) against stop 30, pin 112 on said arm will engage the shoulder at the end of shift link 111, thereby moving said link toward the front of the machine. Link 111 is attached at its rear end to crank 121 (Figs. 2 and 10) which is fast on a rotatably mounted shaft 122. A trigger 123 fixed on shaft 122 engages a lug of left shift clutch detent 42. Therefore, crank 121, shaft 122 and trigger 123 will be rocked by link 111, thus moving detent 42 and engaging shift clutch 41. Clutch 41 will be engaged for a single cycle of operation as arm 24 rebounding from stop 30 will release link 111, thus permitting the spring of detent 42 to urge it to clutch disengaging position.

Escapement 101, 102 will be operated by a cam 124 (Figs. 10) on shift shaft 36. Cam 124 is engaged by a roller at the rear end of a spring urged arm 125. Arm 125 is fixed at its forward end to a transverse shaft 126 which is journalled in the machine framing. A depending yoke 127 is fixed on shaft 126 and, at its lower end, the yoke has a drive pin 127′ engaging a cam slot in a horizontally disposed arm 128. Arm 128 is pivotally mounted at its rear and at its forward end (Figs. 4 and 7) engages a spool formed on sleeve 94. Therefore, when shift clutch 41 is operated, cam 124 will depress arm 125 and then allow it to be spring restored to normal. Shaft 126 and yoke 127 will be rocked by arm 125 and arm 128 will move sleeve 94, gear 95, and escapement pallet 102 to the left and return.

In the leftward movement of the parts, pallet arm 102a will be moved from engagement with the tooth of escapement wheel 101 and pallet arm 102b will be moved into position midway between two of the teeth of the wheel. Therefore, gear 95, on which pallet 102 is fixed, will be released and driven in clockwise direction (Fig. 4); counterclockwise (Fig. 8a) by spring 97 through gear 96 on shaft 93. Gear 91 will be driven in like direction by gear 92 and also sleeve 90 and counting pawl 54. Thus, pallet arm 102b will be moved into engagement with a tooth of escapement wheel 101, thereby preventing further reverse movement of the parts until pallet 102 is moved back to the right with gear 95. The above described operation provides for approximately one half step of movement of the parts. Upon movement of pallet back to the right, arm 102b will be moved from engagement with wheel 101 and arm 102a will be moved into position to engage the next tooth of wheel 101. Therefore, the parts will be released a second time and the full reverse step of movement will be afforded the parts, thereby moving counting pawl 54 and lug 116' into alignment with the next digit slide 50. It will be noted that the multiplier storing and magazine indexing operations may be effected concurrently with the reverse movement of counting pawl 54 and lug 116' as the relative reverse movement of the parts will not be effected by the indexing movement to move the parts as a unit in the opposite direction.

Means must be provided to prevent the reinitiation of registration until the carriage shifting operation is completed. Such means comprises a lever 135 (Fig. 2) pivotally mounted on the left side frame. Lever 135 has an open end slot at the under side of its left rear end above a pin 11b of clutch lever 11. The right arm of lever 135 has link connection 129 with the left arm of a lever 130 (Fig. 10) which has fixed pivotal mounting at the front of the machine. The right free end of lever 130 has a lug engaged by the forward end of carriage locator rod 46. Upon initiation of the carriage shift, locator rod 46 will be moved toward the front of the machine, lever 130 will be rocked clockwise, and link 129 will be moved toward the rear of the machine, thereby rocking lever 135 counterclockwise (Fig. 2). At this time, clutch lever 11 will have been centralized against the bias of toggle spring 103 by the cam slot of extension 31 of stop arm 24. The slot at the rear of lever 135 will therefore engage pin 11b of clutch 11, thereby holding it in neutral position when it is released by extension 31 as arm 24 rebounds from stop 30. At the conclusion of the carriage shifting operation, carriage locator rod 46 will be moved toward the rear, thereby releasing lever 130 and link 129 will be spring moved toward the front of the machine, thus rocking lever 135 and releasing clutch lever 11. Toggle spring 103 will then be effective to rock clutch 11 to active position, thereby starting a registering operation which will be controlled by counting pawl 54 which, during the carriage shift, was moved reversely into alignment with the next digit slide 50. The alternate registering and carriage shifting operations will be effected until counting pawl 54 has been stepped reversely into alignment with the last digit slide which has been set. The carriage shift operation following the final registering operation will release counting pawl 54, which now, however, will be afforded only a half step of movement because pin 98 (Figs. 5 and 8) on gear 95 will engage forked arm 99, thereby preventing further reverse movement of the connected parts. Bail 100, therefore, will be constrained from rocking movement by pin 98, and thus, upon termination of the carriage shift, toggle spring 103 will be ineffective to move clutch lever 11 from neutral position.

AUTOMATIC MULTIPLICATION

(Zero multiplier key)

Depression of zero multiplier key 56 provides for one decade of carriage shift without registration. Upon depression of zero key 56, zero selection lever 64 (Figs. 4 and 6) will be rocked and the setting and indexing clutch 58 will be engaged as heretofore described. As hereinbefore noted, lever 64 is provided with a cam end 64a at its rear which engages arm 140. As lever 64 is rocked, its cam end will rock arm 140 counterclockwise, thereby moving the rightmost tread at the right end of the arm from engagement with stud 76a of setting lever 76. At the same time, blocking portion 64' of lever 64 will be raised into position a very slight distance to the left one of the teeth 66' of selection comb 66, thus blocking leftward movement of the comb. As cam arm 79 is rocked upon operation of clutch 58, setting lever 76 will be released and spring 143 will be effective to rock said lever counterclockwise about its pivotal connection on comb 66. Lever 76 will be limited in its movement by engagement of stud 76a with the left tread of arm 140 and the movement afforded will be effective to move the related storage slide 50 approximately two steps of movement to the left.

Figure 5:
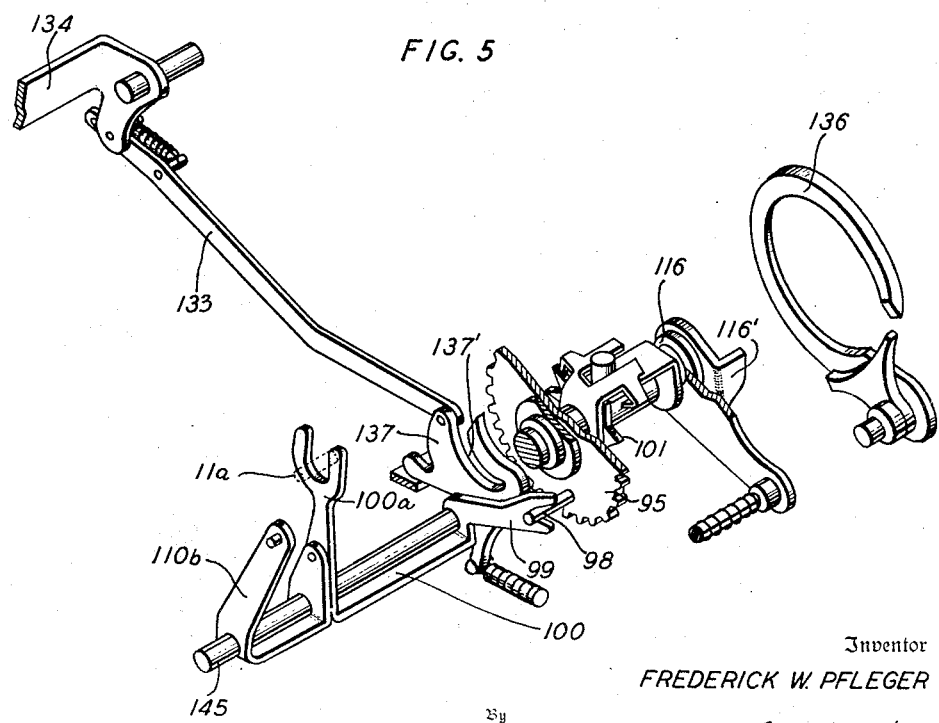
Fig. 5 is a detailed fragmentary perspective of parts shown in Fig. 4 and control mechanisms related therewith.

A fixed ring 136 (Figs. 3, 4, 5 and 7) encircles magazine 48 a slight distance to the left of lugs 50' of slides 50 when said slides are in normal unset position. As shown in Figs. 4 and 5, ring 136 is cut away at a point aligned with the slide 50 which is in setting position. When a slide 50 is moved to the left in a zero setting operation, lug 50' of the slide will be passed through the opening in ring 136, thus bringing said lug to the outer left side of the ring, the edge of the ring defining the top of the opening terminates immediately adjacent the set slide as best seen in Fig. 3. Therefore, in the subsequent indexing operation of magazine 48, the set slide 50 will be moved counterclockwise (Fig. 4) within the ring and the radially extending lug 51' to the left of the ring will prevent said slide from return movement toward the right.

A slide 50 set to zero representing position operates in connection with the aforenoted lug 116' on collar 116 to initiate operation of the carriage shifting mechanism. As heretofore described, collar 116 and lug 116' are rotationally driven in fixed rotation with counting pawl 54. If there are no multiplier values stored in magazine 48, pawl 54 will be in home position and lug 116' will be in position to be engaged by the slide in setting position if said slide is moved to zero representing position, thereby moving collar 116, plate 115, rod 117, and trip pawl 144 to the left to rock lever 119 and release detent 27. As heretofore described, the subsequent initial indexing operation of magazine 48 will result in the movement of clutch lever 11 to active position. However, no registration will be effected as released detent 27 will carry arm 24 against stop 30, thereby initiating a carriage shift and neutralizing clutch lever 11.

If one or more multiplier values have been stored in magazine 48, counting pawl 54 will be aligned with the first of the set slides 50 and lug 116' will therefore be in position to be engaged by the slide as described. If now a slide 50 is set to zero position, it will not engage lug 116' and thus a multiplier value of zero will be stored in the magazine. The subsequent indexing operation will move zero set slide 50 into position to be restrained from right return movement by ring 136 as heretofore described. When pawl 54 is released for a reverse step of movement which will move it into alignment with a slide 50 which is set to zero position, a cam edge at the leading side of lug 116' will be moved into engagement with the left end of the slide and collar 116 will be moved to the left. Detent 27 therefore will be released and upon the movement of arm 24 a carriage shift will be initiated. It will be noted that lug 116' remains engaged with the zero set slide 50 until the next reverse step of movement of the lug. The unidirectional trip pawl 144 on shaft 117 therefore is given sufficient movement to pass beyond lever 119 thereby only momentarily rocking said lever. Such provision is necessary as trigger 28 (Figs. 2 and 2a) must be released to engage pawl 27 upon return of arm 24 from stop 30. If such engagement is not effected, engagement of clutch 9 for a registering operation would result in an erroneous carriage shift. Any slide 50 which is set to zero will be held in set position by ring 136 until, upon subsequent indexing operations, it is moved into setting position. Upon movement into setting position, lug 50' of a zero set slide will be engaged by the right face of a cam segment 132 (Figs. 3, 4 and 5) which has fixed mounting with relation to ring 136 and thereupon the slide will be cammed to the right through the opening in ring 136 to its normal unset position.

Usually the program of multiplication will be effected so rapidly that the multiplier storage capacity of magazine 48 will not be reached. However, should this condition be reached, means are provided to prevent an indexing operation following the setting operation which exhausts the capacity. Such means comprises a crank 137 (Fig. 5) having an open end slot 137' and spring urged in counterclockwise direction. If the capacity has been reached, counting pawl 54 and lug 116' will be in alignment with the slide 50 which will next be indexed into setting position. The pin 98 of gear 95 which has fixed rotational relation to pawl 54 and lug 116' will enter slot 137', thereby rocking crank 137 clockwise about a shaft 145 on which it is pivoted when the exhausted condition of the magazine is reached. Crank 137 has yieldable link connection 133 with a bail 134. Bail 134 extends outwardly from the left side frame and, at its left end, the bail has a detent 134' (Fig. 2) which is normally out of engagement with the periphery of setting and indexing clutch 58. However, when crank 137 is rocked by pin 98, link 133 through bail 134 will yieldably urge detent 134' against the periphery of clutch 58. Therefore, when clutch 58 performs the setting operation which exhausts the capacity of magazine 48, said clutch will be arrested in mid-cycle position and the indexing operation will be held in abeyance. When the slide 50 which is next to be moved to setting position is available, pin 98 will have been moved reversely with gear 95, pawl 54, and lug 116', thereby releasing crank 137 and restoring detent 134' to normal, thus reengaging clutch 58 which will in completing its cycle of operation effect the indexing operation.

Although a preferred form of the invention has been shown and described as embodied in a particular type of calculating machine, it will be understood that the devices of the invention may be employed to control the operation of other types of calculating machines. Also, it will be apparent that the devices of the invention may be subject to considerable alteration without departing from the improved operating principles set forth. The invention, therefore, is not to be considered restricted to the specific embodiment disclosed except as required by the spirit of the appended claims.

I claim:

1. In a motor driven calculating machine having a shiftable carriage, a product register on said carriage, cyclic differential actuators for said register, and means for denominationally shifting said carriage; multiplication control means, comprising a series of differentially settable multiplier storage elements, selection means operable to set said elements each to digit representing positions or to a zero representing position, means for initiating operation of said actuators, control devices operable to terminate operation of said actuators, a member operable in response to operation of said control devices to initiate denominational operation of said carriage shifting means, a feed device for said elements, mounting means adapted for step-by-step adjustment to effect relative movement of said elements with said feed device and said control devices whereby said elements are successively each either located, if set to a digit representing position, for operation by said feed device or rendered effective, if set to said zero representing position, to cause operation of said control devices, means for driving said feed device in time with said actuators thereby feeding an operatively associated storage element toward a position to cause operation of said control devices, drive means operable in response to operation of said control devices to effect a step adjustment of said mounting means, and means operable upon termination of the operation of said shifting means to reinitiate operation of said actuators.

2. In a motor driven calculating machine having a shiftable carriage, a product register on said carriage, cyclic differential actuators for said register, and means for denominationally shifting said carriage; multiplication control means, comprising a series of differentially settable multiplier storage elements, selection means operable to set said elements each in a like direction to digit representing positions or in the opposite direction to a zero representing position, means for initiating operation of said actuators, control devices operable to terminate operation of said actuators, a member operable in response to operation of said control devices to initiate denominational operation of said carriage shifting means, a feed device for said elements, mounting means adapted for step-by-step adjustment to effect relative movement of said elements with said feed device and said control devices whereby said elements are successively each either located, if set to a digit representing position, for operation by said feed device or rendered effective, if set to said zero representing position, to cause operation of said control devices, means for driving said feed device in time with said actuators thereby feeding an operatively associated storage element toward a position to cause operation of said control devices, drive means operable in response to operation of said control devices to effect a step adjustment of said mounting means, and means operable upon termination of the operation of said shifting means to reinitiate operation of said actuators.

3. In a motor driven calculating machine having a shiftable carriage, a product register on said carriage, differential actuators for said register, cyclic drive means for said actuators, full cycle stopping means for said actuator drive means including a member driven by said actuator drive means upon operation of said stopping means, and means for denominationally shifting said carriage; multiplication control means, comprising a series of differentially settable multiplier storage elements, selection means operable to set said elements each to digit representing positions or to a zero representing position, means for initiating operation of said actuator drive means, a contact member engageable to cause operation of said stopping means, means operable by said driven member of said stopping means for initiating denominational operation of said carriage shifting means, a feed device for said elements, mounting means adapted for step-by-step adjustment to effect relative movement of said elements with said feed device and said contact member whereby said elements are successively each either located, if set to a digit representing position, for operation by said feed device or engaged, if set to said zero representing position, with said contact member, means for driving said feed device in time with said actuators thereby feeding an operatively associated storage element toward a position to engage said contact member, drive means operable in response to operation of said stopping means to effect a step adjustment of said mounting means, and means operable upon termination of the operation of said shifting means to reinitiate operation of said actuator drive means.

4. In a motor driven calculating machine having a shiftable carriage, a product register on said carriage, differential actuators for said register, cyclic drive means for said actuators, full cycle stopping means for said actuator drive means, and means for denominationally shifting said carriage; multiplication control means, comprising a series of differentially settable multiplier storage elements, selection means operable to set said elements each to digit representing position or to a zero representing position including digit multiplier keys and a zero multiplier key successively depressible to control the operations respectively, mounting means for said elements adapted for step-by-step adjustment to locate said elements successively in setting position, indexing means operable in response to operation of said selection means to effect a step of adjustment of said mounting means, means for initiating operation of said actuator drive means, devices adjustable with and relative to said mounting means including a contact member engageable by said elements to cause operation of said stopping means and a feed device driven in time with said actuators to feed a digit set element toward said contact member, a member operable in response to operation of said stopping means to initiate denominational operation of said carriage shifting means, drive means operable in response to operation stopping means to adjust said contact member and said feed device relative to said mounting means successively into engagement with zero set elements or into operative association with digit set elements respectively, and means operable upon termination of said shifting means to reinitiate operation of said actuator drive means.

5. The invention according to claim 4 wherein the means for initiating operation of said actuator drive means comprises means operable in response to depression of the digit multiplier keys.

6. The invention according to claim 4 wherein means are provided to prevent reinitiation of the actuator drive means upon termination of an operation of the carriage shifting means following an operation of the stopping means under control of the last of a series of set storage elements, and wherein the adjusting means for the contact member is operable to locate said member for engagement by a storage element upon movement of said element to zero representing position.

7. In a motor driven calculating machine having a shiftable carriage, a product register on said carriage, differential actuators for said register, cyclic drive means for said actuators, full cycle stopping means for said actuator drive means, and means for denominationally shifting said carriage; multiplication control means, comprising a rotary magazine, a series of differentially settable multiplier storage slides mounted in said magazine, selection means operable to set said slides each to digit representing positions or to a zero representing position including digit multiplier keys and a zero multiplier key successively depressible to control the operations respectively, indexing means operable in response to operation of said selection means to effect stepwise rotation of said magazine to bring unset slides successively into setting position, means operable in response to depression of said digit multiplier keys to initiate operation of said actuator drive means, devices rotatable with and relative to said magazine including a contact member engageable by said slides to cause operation of said stopping means and a feed device driven in time with said actuators to feed a digit set slide toward said contact member, a member operable in response to operation of said stopping means to initiate denominational operation of said carriage shifting means, drive means operable in response to operation of said stopping means to adjust said contact member and said feed device reversely relative to said magazine successively into engagement with zero set slides or into operative association with digit set slides respectively, and means operable upon termination of operation of said shifting means to reinitiate operation of said actuator drive means.

8. In a motor driven calculating machine having a shiftable carriage, a product register on said carriage, differential actuators for said register, cyclic drive means for said actuators, full cycle stopping means for said actuator drive means, and means for denominationally shifting said carriage; multiplication control means, comprising a rotary magazine, a series of multiplier storage slides mounted in said magazine each differentially settable from a normal position in a like direction to digit representing positions or settable from said normal position in the opposite direction to a zero representing position, digit multiplier keys and a zero key, setting means operable upon depression of any one of said keys, selection means adjustable upon depression of said keys to control said setting means to set a slide to the position representing the value of a depressed key, indexing means operable in response to operation of said setting means to effect stepwise rotation of said magazine to bring unset slides successively into setting position, devices rotatable with and relative to said magazine including a contact member engageable by said slides to cause operation of said stopping means and a feed device driven in time with said actuators to feed a digit set slide toward said contact member, a member operable in response to operation of said stopping means to initiate denominational operation of said carriage shifting means, drive means operable in response to operation of said stopping means to adjust said contact member and said feed device reversely relative to said magazine successively into engagement with zero set slides or into operative association with digit set slides respectively, and means operable upon termination of operation of said shifting means to reinitiate operation of said actuator drive means.

9. In a motor driven calculating machine having a shiftable carriage, a product register on said carriage, cyclic differential actuators for said register, and means for shifting said carriage; the combination with a rotary magazine, a series of multiplier storage slides mounted in said magazine each differentially settable from a normal position in a given direction to digit representing positions or settable from said normal position in the opposite direction to a zero representing position, and devices operable in conjunction with successive set slides to control operation of said actuators and said carriage shifting means; of digit multiplier keys and a zero key, a drive transmission operable upon depression of said digit keys to move an adjacently positioned slide in said given direction or upon depression of said zero key to move said adjacently positioned slide in said opposite direction, selection means adjustable upon depression of said keys to control the setting operation of said transmission, and indexing means for said magazine operable in response to depression of said keys to bring said slides successively into setting position.

10. The invention according to claim 9 wherein the drive transmission is controlled by motor driven means, and the indexing means for the magazine is operable by said motor driven means subsequent to a setting operation of said drive transmission.

11. In a motor driven calculating machine having a shiftable carriage, a product register on said carriage, cyclic differential actuators for said register, and means for shifting said carriage; the combination with a rotary magazine, a series of multiplier storage slides mounted in said magazine each differentially settable from a normal position in a given direction to digit representing positions or settable from said normal position in the opposite direction to a zero representing position, and devices operable in conjunction with successive set storage slides to control operation of said actuators and said carriage shifting means; of digit multiplier keys and a zero key, setting means operable upon depression of any one of said keys including a lever engageable with said slides and pivotal in one or the opposite direction, selection means adjustable upon depression of said digit keys to cause pivotal movement of said lever in said one direction to set one of said slides to the position representing the value of a depressed digit key or adjustable upon depression of said zero key to cause pivotal movement of said lever in said opposite direction to set said slide to said zero representing position, and indexing means for said magazine operable in response to depression of said keys to bring said slides successively into position for engagement by said lever.

12. The invention according to claim 11 wherein said lever is pivotal about one point in said one direction and about another point in said opposite direction.

13. In a motor driven calculating machine having a shiftable carriage, a product register on said carriage, cyclic differential actuators for said register, and means for shifting said carriage; the combination with a rotary magazine, a series of multiplier storage slides mounted in said magazine each differentially settable from a normal position in a given direction to digit representing positions or settable from said normal position in the opposite direction to a zero representing position, and devices operable in conjunction with successive set storage slides to control operation of said actuators and said carriage shifting means; of digit multiplier keys and a zero key, a lever having one of its ends engageable with said slides and having a movable point of pivot intermediate its ends and at its opposite end, spring means for biasing said lever in a given direction about its end pivot point, spring means for biasing said lever in the opposite direction about its intermediate pivot point, blocking means for restraining said lever from pivotal movement and adjustable upon depression of said digit keys to release said lever for pivotal movement in one of said directions and upon depression of said zero key for pivotal movement in the other of said directions, selection means adjustable upon depression of said keys to determine the excursions of said lever, and indexing means for said magazine operable in response to depression of said keys to bring said slides successively into position for engagement by said lever.

FREDERICK W. PFLEGER.

References Cited in the file of this patent

UNITED STATES PATENTS

| Number | Name | Date |
|---|---|---|
| 1,409,575 | Rechnitzer | Mar. 14, 1922 |
| 2,371,752 | Friden | Mar. 20, 1945 |
| 2,538,896 | Britten, Jr. | Jan. 23, 1951 |

FOREIGN PATENTS

| Number | Country | Date |
|---|---|---|
| 156,715 | Great Britain | Jan. 7, 1921 |